(12) United States Patent
Gobeyn et al.

(10) Patent No.: US 7,836,093 B2
(45) Date of Patent: Nov. 16, 2010

(54) IMAGE RECORD TREND IDENTIFICATION FOR USER PROFILES

(75) Inventors: Kevin M. Gobeyn, Honeoye Falls, NY (US); Dale F. McIntyre, Honeoye Falls, NY (US); Robert B. Poetker, Penfield, NY (US); Kevin R. Delong, Victor, NY (US); Anthony Scalise, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 350 days.

(21) Appl. No.: 11/953,908

(22) Filed: Dec. 11, 2007

(65) Prior Publication Data

US 2009/0150330 A1 Jun. 11, 2009

(51) Int. Cl.
*G06F 17/30* (2006.01)
(52) U.S. Cl. .................. 707/802; 707/100; 705/14.66
(58) Field of Classification Search .......... 707/100, 707/733, 734, 784, 802, E17.059, E17.06; 705/14.66, 27
See application file for complete search history.

(56) References Cited

U.S. PATENT DOCUMENTS

| | | | |
|---|---|---|---|
| 6,216,133 B1 | 4/2001 | Masthoff | 707/104 |
| 6,539,375 B2 | 3/2003 | Kawasaki | 707/5 |
| 6,606,411 B1 | 8/2003 | Loui et al. | 382/224 |
| 6,785,421 B1 | 8/2004 | Gindele et al. | 382/217 |
| 6,810,149 B1 | 10/2004 | Squilla et al. | 382/224 |
| 7,110,575 B2 | 9/2006 | Chen et al. | 382/118 |
| 7,142,697 B2 | 11/2006 | Huang et al. | 382/118 |
| 7,212,668 B1 | 5/2007 | Luo et al. | 382/165 |
| 7,218,759 B1 | 5/2007 | Ho et al. | 382/118 |
| 2001/0041020 A1 | 11/2001 | Shaffer et al. | 382/305 |
| 2003/0101104 A1 | 5/2003 | Dimitrova et al. | 705/27 |
| 2004/0120572 A1 | 6/2004 | Luo et al. | 382/159 |
| 2005/0018216 A1 | 1/2005 | Barsness et al. | 358/1.6 |
| 2006/0074771 A1 | 4/2006 | Kim et al. | |
| 2006/0268007 A1 | 11/2006 | Gopalakrishnan | 345/619 |
| 2007/0201822 A1 | 8/2007 | Kusunoki et al. | |

FOREIGN PATENT DOCUMENTS

| | | |
|---|---|---|
| EP | 0 990 996 A2 | 4/2000 |
| EP | 1 624 676 A2 | 2/2006 |
| WO | WO 2005/027519 A1 | 3/2005 |
| WO | WO 2006/048820 A1 | 5/2006 |
| WO | WO 2006/055514 A1 | 5/2006 |

OTHER PUBLICATIONS

Agnihotri et al., User Study for Generating Personalized Summary Profiles, 2005, IEEE, pp. 1-4.*

* cited by examiner

*Primary Examiner*—Fred I Ehichioya
(74) *Attorney, Agent, or Firm*—Justin D. Petruzzelli; Raymond L. Owens

(57) ABSTRACT

Systems and methods for generating user profiles based at least upon an analysis of image content from digital image records are provided. The image content analysis is performed to identify trends that are used to identify user subject interests. The user subject interests may be incorporated into a user profile that is stored in a processor-accessible memory system.

16 Claims, 8 Drawing Sheets

IMAGE RECORD TREND IDENTIFICATION FOR USER PROFILES

FIELD OF THE INVENTION

This invention generally relates to using information from digital image records associated with a user to identify the user's interests.

BACKGROUND

Targeted marketing, well known in the art, allows a retailer to present products that may have special appeal to an audience that has effectively been "pre-screened." That is, targeted marketing aims to identify "pre-screened" consumers who are likely to have a high level-of-interest in specific products and services.

One way of identifying "pre-screened" consumers is by the use of "user profiles". The phrase "user profile," as used herein, refers to a collection of information that indicates the interests of an associated user, regardless of the collection's form or the manner in which it is stored. A user profile may be associated with a particular consumer and may indicate, for example, that the particular consumer enjoys hiking. Accordingly, the user profile may be used by a targeted marketer to generate an advertisement for the particular consumer regarding an upcoming sale on hiking goods.

It is recognized that the effectiveness of targeted marketing depends upon the quantity and quality of information retained in such user profiles. Accordingly, there is an ongoing need for additional or improved techniques for generating user profiles.

SUMMARY

The above-described problem is addressed and a technical solution is achieved in the art by systems and methods for generating a user profile according to various embodiments of the present invention.

In embodiments of the present invention, one or more trends are identified based at least upon an analysis of image content from a plurality of digital image records associated with a user. Analyzing image content from digital image records and, more specifically, identifying trends from such image content, provides valuable information about a user that may be incorporated into a user profile. The analysis of image content may include, for example, a scene classification process, a face detection process, an object detection process, an audio analysis process, a text-from-image extraction process, or an event clustering process, all of which are known in the art.

One example of a trend relates to multiple digital image records that are deemed to have captured an event. For instance, an analysis of a plurality of digital image records may indicate that several of them captured a particular birthday party. In this example, the trend relates to the several image records deemed to have captured the birthday party. Other examples of trends relate to multiple digital image records that are deemed to have captured a reoccurring event, a same object, or have been acquired at a same location. Accordingly, it can be seen that a "trend", as used herein, relates to any commonality between multiple digital image records. Otherwise, the invention is not limited to the type of trend identified.

Upon identification of the trends, a plurality of user subject interests may be identified based at least upon an analysis of the trends. Examples of a user subject interest are an object, which may be a person, an activity, a location, or combinations thereof. A user profile associated with the user may be generated based at least upon the user subject interests. It should be noted that the term "generate", as used herein in the context of generating a user profile, is intended to include generating a new user profile or updating an existing user profile. The generated user profile may be stored in a processor-accessible memory system.

According to some embodiments of the present invention, user preferences may be identified based at least upon an analysis of the identified trends. In this regard, the user profile may further be generated based at least upon the user preferences. User preferences may link at least two of the subject interests together. For example, an analysis of a user's digital image records may reveal two user subject interests: skiing and a particular person. The analysis of the digital image records may also reveal that the digital images that captured skiing activities also captured the particular person. Accordingly, a user preference may be identified that links skiing to the particular person, which may lead to an inference that the user enjoys skiing with the particular person.

According to some embodiments of the present invention, a level-of-interest is generated for at least some of the user subject interests based at least upon an analysis of the trends. In this regard, the user profile may further be generated based at least upon the levels of interest. An example level-of-interest is an indication of the amount of affinity that a user has with a particular user subject interest or groups of user subject interests. Accordingly, such levels of interest may be used to determine that a user prefers one user subject interest more than another.

According to some embodiments of the present invention, an invitation relevant to a user subject interest may be generated for the user based at least upon an analysis of the user profile. Such invitation may be stored in a processor-accessible memory system. An example invitation is an advertisement. To elaborate, assume that a user subject interest is beaches. The invitation may be a beach-clothing advertisement generated for the user, which is relevant to the user subject interest, in this case, beaches.

In addition to the embodiments described above, further embodiments will become apparent by reference to the drawings and by study of the following detailed description.

BRIEF DESCRIPTION OF THE DRAWINGS

The present invention will be more readily understood from the detailed description of exemplary embodiments presented below considered in conjunction with the attached drawings, of which.

DETAILED DESCRIPTION

Embodiments of the present invention identify trends based at least upon an analysis of image content from a plurality of digital image records associated with a user. Each trend represents commonality between multiple digital image records and is inferred or derived from such commonality. Analyzing image content from digital image records and, more specifically, identifying trends from such image content, provides valuable information about a user. Consequently, such information may advantageously be incorporated into a user profile that may later be used for targeted marketing.

The phrase "digital image record," as used herein, is intended to include digital still images as well as digital video. Also, it should be noted that, unless otherwise explicitly noted or required by context, the word "or" is used in this disclosure in a non-exclusive sense. In addition, functions described herein may be implemented as "software" or "software programs". Those skilled in the art will recognize, however, that the equivalent functions of such software can also be readily executed in hardware.

Figure 1:
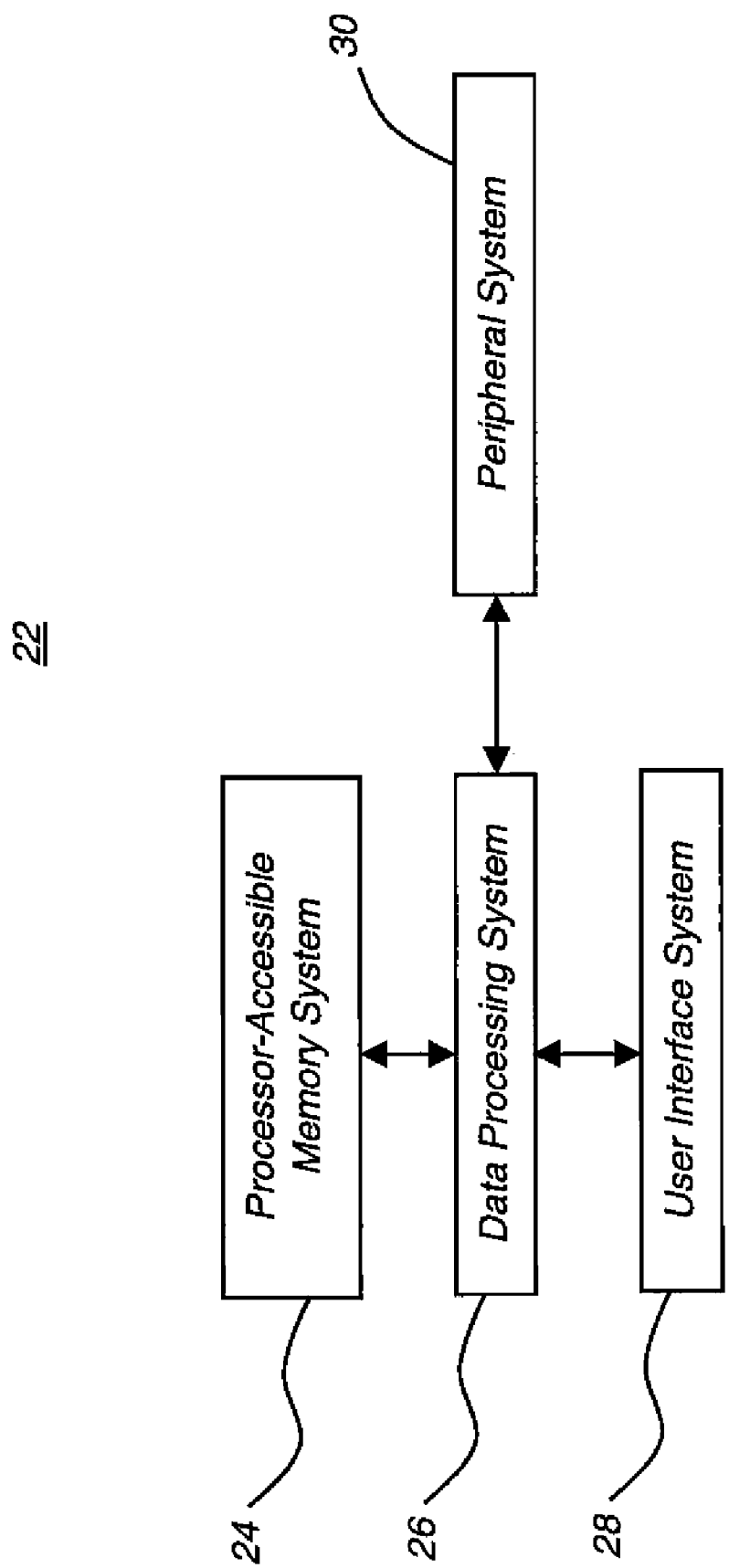
FIG. 1 illustrates a system for generating user profiles, according to an embodiment of the present invention.

FIG. 1 illustrates a system 22 for generating a user profile, according to an embodiment of the present invention. The system 22 includes a data processing system 26, a peripheral system 30, a user interface system 28, and a processor-accessible memory system 24. The processor-accessible memory system 24, the peripheral system 30, and the user interface system 28 are communicatively connected to the data processing system 26. The data processing system 26 includes one or more data processing devices that implement the processes of the various embodiments of the present invention, including the example processes of FIG. 2 described herein.

The phrases "data processing device" or "data processor" are intended to include any data processing device, such as a central processing unit ("CPU"), a desktop computer, a laptop computer, a mainframe computer, a personal digital assistant, a Blackberry™, a digital camera, cellular phone, or any other device for processing data, managing data, or handling data, whether implemented with electrical, magnetic, optical, biological components, or otherwise.

Figure 2:
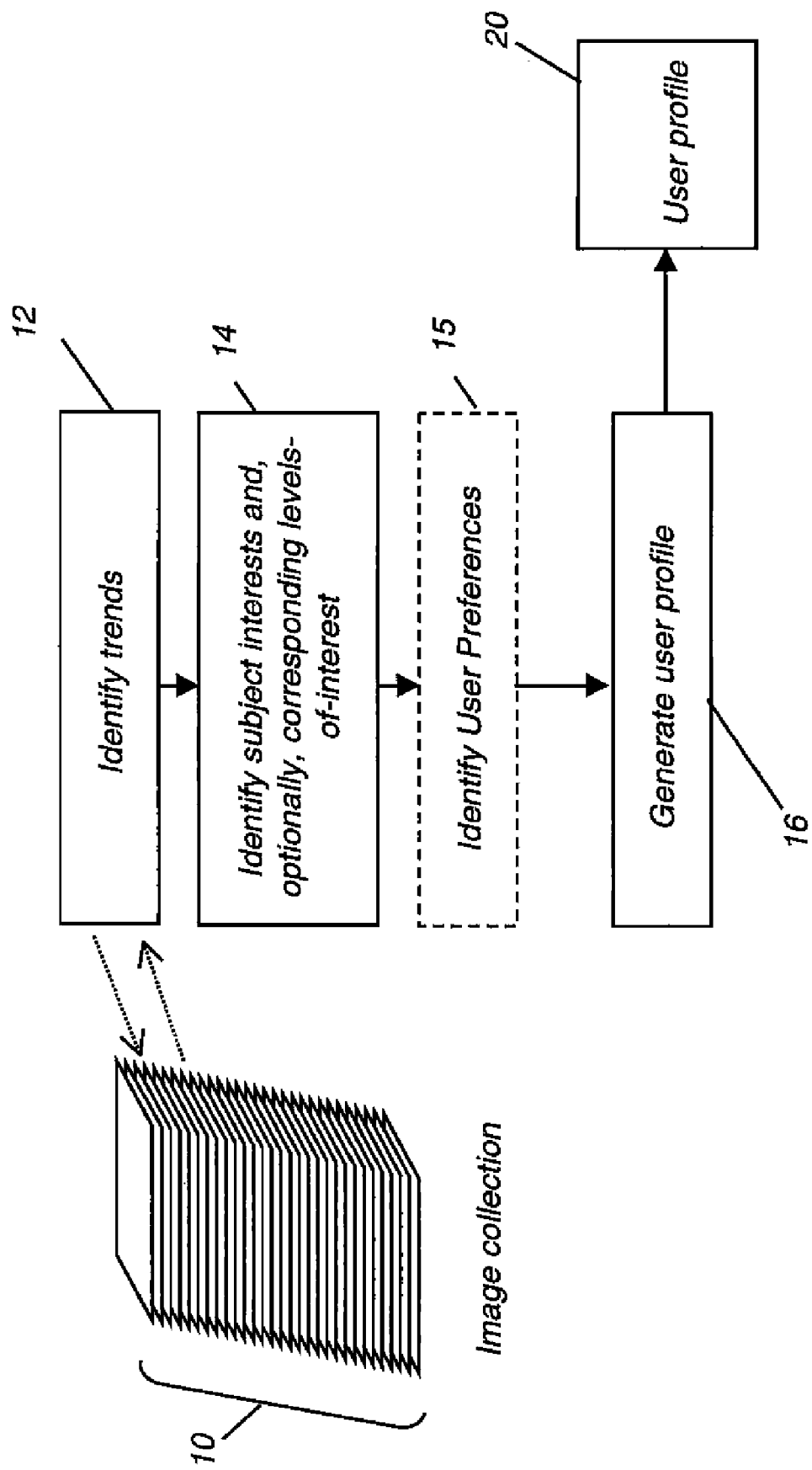
FIG. 2 illustrates methods for user profile generation, according to various embodiments of the present invention.

The processor-accessible memory system 24 includes one or more processor-accessible memories configured to store information, including the information needed to execute the processes of the various embodiments of the present invention, including the example processes of FIG. 2 described herein. The processor-accessible memory system 24 may be a distributed processor-accessible memory system including multiple processor-accessible memories communicatively connected to the data processing system 26 via a plurality of computers and/or devices. On the other hand, the processor-accessible memory system 24 need not be a distributed processor-accessible memory system and, consequently, may include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, floppy disks, hard disks, Compact Discs, DVDs, flash memories, ROMs, and RAMs.

The phrase "communicatively connected" is intended to include any type of connection, whether wired or wireless, between devices, data processors, or programs in which data may be communicated. Further, the phrase "communicatively connected" is intended to include a connection between devices or programs within a single data processor, a connection between devices or programs located in different data processors, and a connection between devices not located in data processors at all. In this regard, although the processor-accessible memory system 24 is shown separately from the data processing system 26, one skilled in the art will appreciate that the processor-accessible memory system 24 may be stored completely or partially within the data processing system 26. Further in this regard, although the peripheral system 30 and the user interface system 28 are shown separately from the data processing system 26, one skilled in the art will appreciate that one or both of such systems may be stored completely or partially within the data processing system 26.

The peripheral system 30 may include one or more devices configured to provide digital image records to the data processing system 26. For example, the peripheral system 30 may include digital video cameras, cellular phones, regular digital cameras, or other computers. The data processing system 26, upon receipt of digital image records from a device in the peripheral system 30, may store such digital image records in the processor-accessible memory system 24.

The user interface system 28 may include a mouse, a keyboard, another computer, or any device or combination of devices from which data is input to the data processing system 26. In this regard, although the peripheral system 30 is shown separately from the user interface system 28, the peripheral system 30 may be included as part of the user interface system 28.

The user interface system 28 also may include a display device, a processor-accessible memory, a display device and a processor-accessible memory, or any device or combination of devices to which data is output by the data processing system 26. In this regard, if the user interface system 28 includes a processor-accessible memory, such memory may be part of the processor-accessible memory system 24 even though the user interface system 28 and the processor-accessible memory system 24 are shown separately in FIG. 1.

Image records stored in a digital image-record collection in the processor-accessible memory system 24 may be linked to a variable amount of metadata. This image metadata can include various semantic and structural information related to the conditions under which the image was captured as well as information obtained about image contents. By way of illustration, metadata for a digital image record can include date and time of image capture, the capture location (provided by a Global Positioning Satellite, GPS, for example), camera owner, camera type, image resolution, comments from the operator or viewer of the image, and various data obtained from the image content itself, including information identifying the subject(s) of the image, for example. Semantic information obtained and stored as metadata for a digital image record can include various information obtained from objects in the image, including data from image analysis tools known in the art, such as various software applications providing object recognition or face recognition. Semantic information for a digital image record can also be obtained from traditional scene classifiers used to determine beach scenes, snow scenes, outdoor scenes, indoor scenes and many other types of scenes. Similarly, material classifiers produce semantic information for digital image records for classifying the presence of materials such as rock, sand, metal, glass, wood and many other types of materials.

Referring to FIG. 2, there is given a logic flow diagram of methods for generating a user profile 20 from a digital image record collection 10, according to various embodiments of the present invention. A trend identification step 12 is executed to identify one or more trends from digital image record collection 10. User subject interests are identified at step 14 based at least upon an analysis of the trends identified at step 12. Optionally, at step 14, levels of interest may be generated, in addition to the user subject interests, based at least upon an analysis of the trends identified at step 12. The levels of interest may indicate a level of affinity that the user has for a user subject interest. At an optional step 15, user preferences may be generated based at least upon an analysis of the trends identified in step 12. The user preferences link user subject interests generated at step 14. For example, a user preference may indicate that when a user is participating in a first user subject interest, the user also enjoys participating in a second user subject interest. At step 16, a user profile 20 may be generated that encapsulates the information obtained about the user in steps 12, 14, and 15. The user profile 20 may be stored in the processor-accessible memory system 24. Although not required, the information in the user profile 20 may be used subsequently for making appropriate invitations, such as advertisements, for the user to purchase products or services.

User digital image record collection 10 may include a plurality of digital image records, which may be still or video images. Such digital image records may have been captured using various types of digital cameras or may have been scanned from conventional photographs and stored digitally. One of ordinary skill in the art will appreciate that the invention is not limited to the manner in which the digital image records were acquired. Digital image records in digital image record collection 10 may have accompanying metadata ranging from date/time stamp information to full-fledged data on imaging conditions, GPS location, type of capture device employed, image capture conditions, and the like.

With respect to trend identification step 12, it is instructive to elaborate on what constitutes a trend, as the term is used herein. A trend involves commonality, such as a pattern, that is detected based at least upon an analysis of image content from multiple digital image records. In this regard, the phrase "image content," as used herein, is intended to refer to the representation of radiation or audio recorded in a digital image record, as opposed to metadata or other header or textual information that may be associated with a digital image record. The analysis of image content used to detect commonality may be performed using techniques known in the art. For example, scene classification processes, face detection processes, object detection processes, audio analysis processes, a text extraction process in which text is identified as an object in the image content itself, or event clustering processes known in the art may be used. Commonality further may be detected from an analysis of metadata or other information associated with a digital image record.

The commonality upon which a trend is derived may relate to events, objects, locations, time, or other factors and may include a combination of factors. In this regard, one type of trend is derived from an event-based commonality. For example, an event-based commonality may be identified as multiple digital image records that are deemed to have captured a same event. From such a commonality, a trend may be derived. For instance, digital image records captured during a trip to Europe may be used to derive a trend, because they exhibit a commonality that they were all acquired during the same event, namely the trip to Europe. Such a trend may, for example, be used in step 14 to identify trips to Europe as a user subject interest. Other examples of events include holidays, birthday parties, etc., as well as activities, such as hiking, running, horseback riding, playing golf, etc. Accordingly, one skilled in the art will appreciate that the invention is not limited to event types.

It should be noted that identification of events based at least upon an analysis of image content may be performed using techniques known in the art. Event detection techniques are described, for example, in commonly assigned U.S. Pat. No. 6,606,411 entitled "Method for Automatically Classifying Images into Events" to Loui et al. Event clustering techniques are described, for example, in commonly assigned U.S. Pat. No. 6,606,411 to Loui et al.

Another type of trend is derived from an object-based commonality. For example, an object-based commonality may be identified, using object recognition analyses known in the art, as multiple image records capturing a same person, a same pet, a same house, a same clothing article, etc. In this regard, one skilled in the art will appreciate that the invention is not limited to any particular kind of object. Further, the term "object," as used herein, may include multiple parts. For example, a car is an object made of many parts, such as an engine, tires, etc. A group of people is an object made up of several persons. Accordingly, one skilled in the art will appreciate that the term "object" is not limited to a single indivisible object and, instead, may include complex objects including multiple parts. In this regard, for example, a car and a group of people each may be considered an "object."

In the case of a trend derived from an object-based commonality, where plural image records have been deemed to have captured a same person, for example, a corresponding user subject interest indicating the same person may be generated at step 14. Plural image records may be deemed to have captured a same person by using conventional techniques, such as face detection or face recognition techniques. Face detection algorithms are well known and have been described, for example, in U.S. Pat. No. 7,218,759 entitled "Face Detection in Digital Images" to Ho et al. and commonly assigned U.S. Pat. No. 7,110,575 entitled "Method for Locating Faces in Digital Color Images" to Chen et al. Face recognition algorithms, also known in the art, then analyze identified face digital image records to assign an identity to one or more detected faces. U.S. Pat. No. 7,142,697 entitled "Pose-Invariant Face Recognition System and Process" to Huang et al. describes the use of model digital image records as tools for training a neural network to recognize faces in digital image records.

Yet another type of trend is derived from a location-based commonality. For example, a location-based commonality may be identified as multiple digital image records that are deemed to have been captured at a same location. For example, a trend may be detected where conventional object-recognition analyses performed on a digital image record collection show a pattern of image-taking at the same location or at the same type of location. For example, a digital image record collection associated with a user may have groups of pictures taken in Paris, France, as recognized by the Eiffel Tower identified within them. The digital image record collection also may include pictures taken at different locations, but these locations are all deemed to be of the same type, e.g., they may all be deemed beaches as recognized by the sand and ocean identified within them.

Still yet another type of trend is derived from a time-based commonality. For example, a time-based commonality may be identified as multiple digital image records that are deemed to have been captured, e.g., contiguously or substantially contiguously within a span of time or reoccurring spans of time. For example, a time-based commonality may be identified from an analysis of image content that reveals that a first group of digital image records include images of pumpkins. Because the first group of digital image records include images of pumpkins, it may be inferred that this group of digital image records were captured substantially contiguously in September or October. To continue this example, assume that a second group of digital image records also have images of pumpkins. However, assume that the first group of digital images include images of a particular person wearing a particular shirt, and the second group of digital images include images of the particular person wearing a different shirt. Consequently, it may be inferred that the first and second groups of digital image records were captured within reoccurring spans of time, e.g., different days in September or October, possibly during the same or different years. In the case of a trend derived from such a time-based commonality, e.g., where plural image records have been deemed to have been captured contiguously or substantially contiguously within September or October, a corresponding user subject interest indicating the user's interest in this time of year may be generated at step 14.

Trends also may be derived from a combination of commonality factors, such as event, object, location, time, etc., set forth above. For example, a trend may relate to multiple digital image records that are deemed to have captured a reoccurring event, where the reoccurrence is a time-based commonality factor combined with an event-based commonality factor. For instance, an analysis of a set of plural digital image records may reveal that the user took multiple family vacations at a beach. That is, the family vacations at the beach (events) reoccurred (time). This trend may result in generation of a user subject interest in 'family vacations at the beach' at step 14. Another example of a trend relating to a combination of commonality factors is based on plural digital image records deemed to have captured both a particular person (object) and a birthday party (event). This trend may result in generation of a user subject interest in 'birthday parties with the particular person' at step 14.

According to some embodiments of the present invention, a minimum amount of commonality may be required in order for a trend to be identified. In other words, a commonality threshold may be required to be met before a trend is identified at step 12. Although not required, the use of commonality thresholds facilitates the identification of strong, meaningful trends at step 12. For example, such a commonality-threshold may indicate that a commonality must be detected among at least X digital image records before a trend is identified, where X is a predefined integer. If X is five, and only four digital image records in the collection 10 are deemed to include an image of a sailboat (e.g., an object-based commonality), a trend would not be identified at step 12 based on this object-based commonality. However, if ten digital image records in the collection 10 are deemed to have been captured at a beach (e.g., a location-based commonality), then a trend would be identified at step 12 based on this location-based commonality.

It should be noted that, although the above examples pertain to analyzing image content of digital image records to identify trends, one skilled in the art will appreciate that any other relevant information may be used to supplement such analysis. For example, as is familiar to those of ordinary skill in the digital imaging arts, increasing amounts of metadata are being made available with digital image records obtained from today's digital cameras. For example, digital image records currently obtained from a digital camera often have accompanying metadata that describes date, time, and location of image capture, such as from GPS data obtained by the camera. This information can also include conditions under which the image was obtained and photographer identification, and can even have various data about the image content itself. Standard information data fields or "tags" that can accompany a digital image record are defined, for example, in the Digital Still Camera Image File Format Standard, also termed the EXchangeable Image File or EXIF Standard, v.2.1, from the Japan Electronic Industry Development Association (JEIDA) CP-3451.

Such metadata may be used to improve the reliability or accuracy of the trend-identification performed at step 12 in FIG. 2 (as well as the reliability or accuracy of the user subject interests or user preferences generated at steps 14 and 15). For example, assume that an object-detection analysis reveals that each digital image record in a group of digital image records includes an image of a pumpkin, thereby illustrating an object-based commonality trend. This object-based commonality trend may be used in step 14 to determine that the user has a subject interest in pumpkins. However, the metadata associated with the group of digital image records that captured the pumpkins may further indicate that they were captured during the first week of October across multiple years, thereby illustrating a time-based commonality trend. Accordingly, instead of merely identifying an object-based commonality trend, the metadata may be used to identify a more specific object- and time-based commonality trend. This combined-commonality-based trend may be used at step 14 to determine a more specific user subject interest than merely pumpkins, such as 'pumpkins during the first week of October.' This user subject interest could be added to the user profile 20 at step 16 and then later used to generate an invitation for the user to go pumpkin picking at a particular farm during the first week of October.

While metadata is just one example of supplemental information that may be used in addition to the image-content based analysis used at step 12 and described above, one skilled in the art will appreciate that any other supplemental information may be used to assist in the identification of trends among digital image records in the collection 10.

The user subject interest or interests that are identified in step 14 can be any of a number of items that are associated with the trends identified in step 12. A user subject interest may relate to events, objects, locations, time, or combinations thereof. In this regard, in a simple case, a user subject interest may be derived from the commonality on which a trend is based. For example, assume that a trend is identified at step 12 from a group of digital image records deemed to have captured fireworks in summer. The commonality of this group of digital image records is that they captured fireworks (which is an event-based commonality) during summer (which is a time-based commonality). Accordingly, in a simple case, a user subject interest may be deemed "fireworks in summer." This user subject interest may be included in the user profile 20 at step 16.

However, user subject interests are not limited to this simple case, and may include inferences or extrapolations beyond the commonality associated with a trend. Such inferences or extrapolations may be based upon additional information beyond the commonality associated with a trend. For example, assume that such additional information is that the user lives in the United States. Also assume that a trend is identified at step 12 from a group of digital image records deemed to have captured fireworks in summer. In this case, a more specific user subject interest may be inferred beyond merely "fireworks in summer." Instead, for example, the user subject interest may be identified as "fireworks on July $4^{th}$", because it is known that the user lives in the United States. Although this example uses additional information about the user, i.e., that the user lives in the United States, one of ordinary skill in the art will appreciate that any other information may be used to generate a better estimate of user subject interests based on the trends identified at step 12.

In this regard, such additional information may be derived from other trends identified at step 12. That is, there does not need to be a one-to-one correspondence between trends and user-subject interests. For example, assume that step 12 identifies three trends: (1) digital image records deemed to have captured hiking, (2) digital image records deemed to have captured a national park, and (3) digital image records deemed to have captured fishing. At step 14, a user subject interest of "outdoor activities" may be generated based at least upon these three trends.

Accordingly, it can be seen that determining user subject interests may be more complex than simply assigning a trend-commonality to a user subject interest. For example, user A may have numerous pictures, taken over a period of time, of different dogs, as could be detected by different hair color or shape metrics. User B, on the other hand, could have numerous pictures, taken at different times, of what appears to be the same dog. Accordingly, user A may have a user subject interest indicating that User A is a dog fancier or dog breeder. User B, on the other hand, may have a user subject interest indicating that User B is a dog owner. Notably, this differentiation could not be readily inferred from an analysis performed on the content of a single image, but is more accurately obtained from determining a trend from multiple digital content records taken over some period of time.

Figure 5:
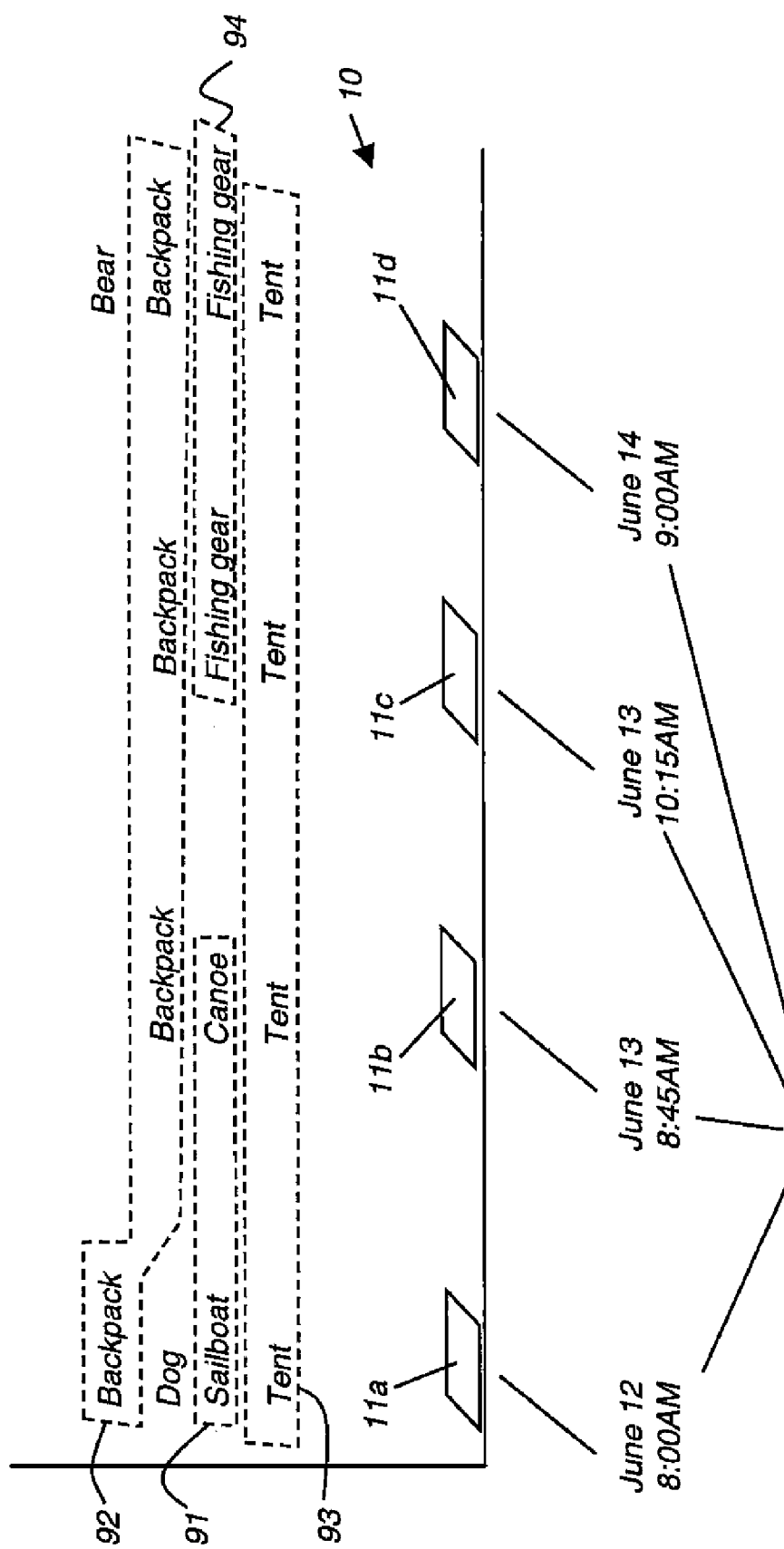
FIG. 5 is a schematic diagram showing how trend information, user subject interests, and user preferences can be obtained from digital image records, according to various embodiments of the present invention.

The schematic diagram of FIG. 5 gives a simple illustration of how trends can be obtained from a digital image record collection and helps to show how trends differ from user subject interests. In this example, there are four digital image records, each labeled 11*a*, 11*b*, 11*c*, and 11*d*, in the user's digital image record collection 10. Each digital image record is taken at a different time, as shown by the time stamps 90 in FIG. 5, which may be indicated by metadata associated with the digital image records. In this example, objects identified within each digital image record 11*a*-11*d* are listed above each digital image record 11*a*-11*d*. As can be seen from this example, commonality of objects that exist between digital image records from the digital image record collection 10 can be used to identify trends, which are indicated by the dotted lines in FIG. 5.

From the trends, user subject interests may be determined at step 14. Thus, in this example, simple user subject interests of "backpacks" and "tents" may be identified from trends 92, 93, respectively. In the alternative or in addition, a more complex user subject interest of "backwoods camping" may be identified based on trends 92 and 93, as well as additional information, such as other objects identified in the digital content records, such as "Fishing Gear," "Bear," and "Hiking Trail." By way of contrast, dog ownership would not be inferred as a user subject interest, since only digital image record 11*a* contains an image of a dog and, consequently, there is no trend. A user subject interest in boating might be generated because a sailboat object and a canoe object were identified in trend 91 through digital image records 11*a*, 11*b*, respectively. However, in some embodiments of the present invention, the sailboat user subject interest may have a lower relative level-of-interest than the "backpack," "tent," or "backwoods camping" user subject interests, because its trend spans two of the four digital image records, and each of the other user subject interests have a trend 92, 93, or both 92, 93 that spans all four digital image records.

Depending upon design choice, FIG. 5 also may illustrate user preferences. For example, in the case where simple user subject interests of "Backpacks" and "Tents" are generated, an additional processing step may determine that both of the subject interests were derived from trends including overlapping digital image records. That is, both of these user subject interests were derived from trends 92, 93 including all four digital image records 11*a*-11*d*. Such overlap may be used as a basis for generating a user preference that links both user subject interests together. In this case, the user preference may indicate that when the user goes somewhere with a tent, the user also brings a backpack.

If a user subject interest in boating is identified based on trend 91, a user preference may be generated by linking the boating user subject interest with the backpack and tent user subject interests because the backpack and tent trends 92, 93 include the same digital image records 11*a*, 11*b* as trend 91. This preference may indicate that the user prefers to bring a backpack and tent when boating. However, a user preference linking the boating user subject interest with a fishing gear user subject interest would not be generated, because the corresponding trends 91, 94 do not include overlapping digital image records. To elaborate, the boating user subject interest is based on a trend involving digital image records 11*a*, 11*b*, whereas the fishing gear user subject interest is based on a trend involving digital image records 11*c*, 11*d*.

The analysis of the trends in step 14 (FIG. 2) provides a rich base of information not only for identifying the user subject interests, but also for optionally determining a level-of-interest exhibited by a particular user. Accordingly, in addition to determining user subject interests at step 14, embodiments of the present invention determine levels-of-interest associated with the user subject interests. Such levels-of-interest may be used as an indication of how likely a user is going to respond to a particular invitation to purchase a product or service.

In this regard, step 14 may include not only an analysis of the trends identified in step 12 to determine user subject interests, but also may include an analysis of the trends identified in step 12 to determine levels-of-interest for the user subject interests. For example, if a user subject interest is identified from a trend involving a relatively high percentage of digital image records from the collection 10, a relatively high level-of-interest may be associated with that user subject interest. To elaborate, assume that a user subject interest is defined as sports, and this user subject interest was identified from a trend involving eight hundred digital image records out of one thousand digital image records in the collection 10. That is, assume that the image content of the eight hundred digital image records are associated with sports in some way. Because this trend involves 80% of the digital image records in the collection 10, it may be deemed that there is a high level-of-interest in the sports user subject interest. On the other hand, if the trend involved 1% of the digital image records in the collection 10, it may be deemed that there is a low level-of-interest in the sports user subject interest.

In addition to or in lieu of considering the percentage of digital image records in the collection 10, another factor for evaluating a level-of-interest of a user subject interest may be the recency of the digital image records involved in a trend upon which the user subject interest is based. Thus, a trend involving more recent digital image records can result in a corresponding user subject interest being given a higher level-of-interest than user subject interests having corresponding trends involving less recent digital image records.

In addition to or in lieu of one or both of the factors described above, in the case of object-commonality-based trends, another factor for determining level-of-interest may be whether or not the object-in-question commonly is a main subject of the digital image records involved in a trend from which the corresponding user subject interest is identified. Methods for identifying the main subject are described, for example, in commonly assigned U.S. Pat. No. 7,212,668 entitled "Digital Image Processing System and Method for Emphasizing a Main Subject of an Image" to Luo et al. If the object-in-question is commonly the main subject of the digital image records involved in a trend, a higher level-of-interest may be associated with the corresponding user subject interest than if the object-in-question commonly was not the main subject of digital image records.

Figure 6:
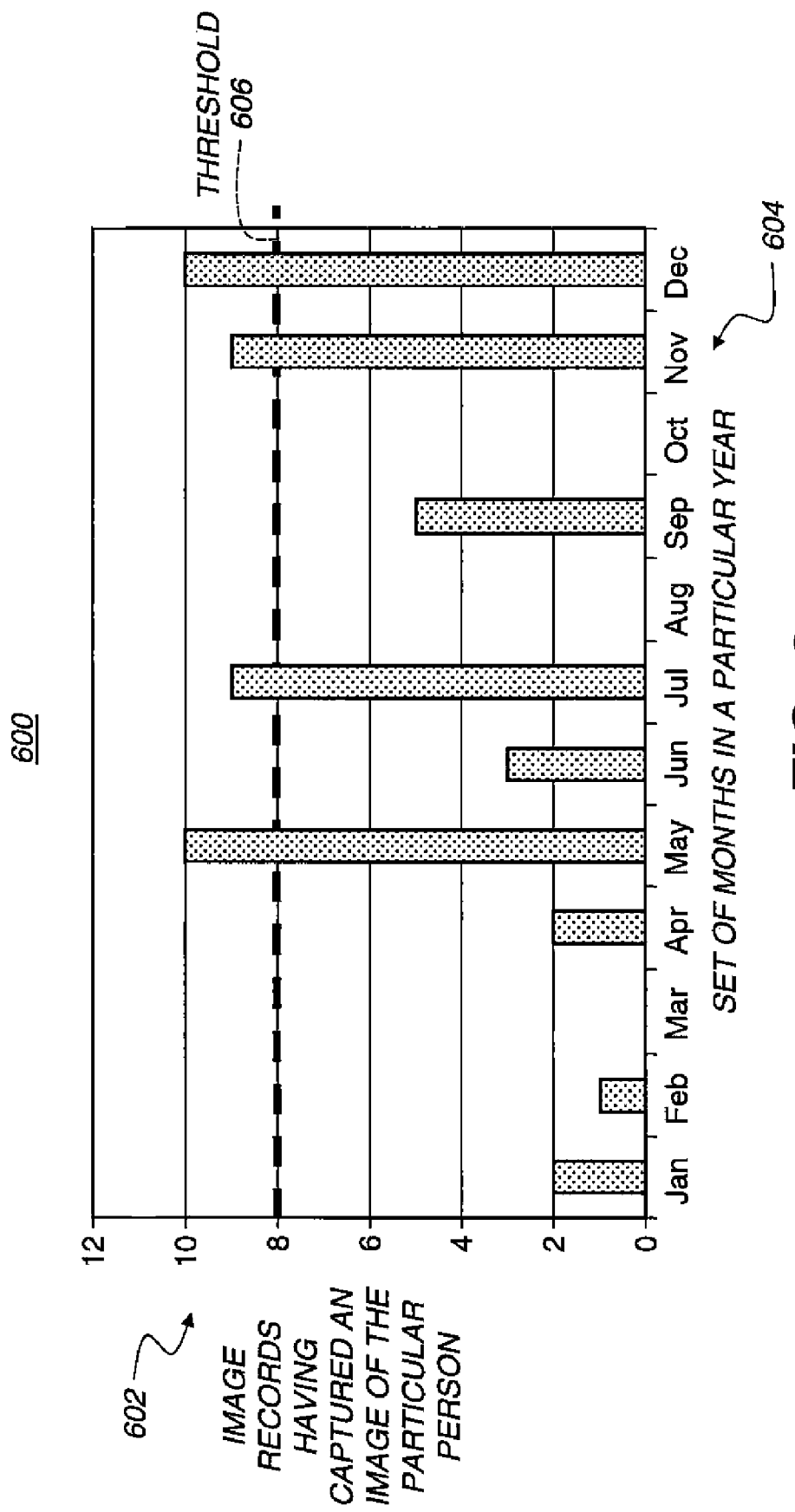
FIGS. 6-8 illustrate embodiments where the number of instances of a commonality upon which a trend is based is considered in a level-of-interest determination.

In addition to or in lieu of one or more of the factors described above, another factor for determining level-of-interest may be considered in the case where a trend involves at least two commonalities. In this case, this other factor is the number of different instances of at least one of the two commonalities. In some embodiments, the different instances, optionally, must be deemed to involve at least a threshold number of digital image records representing at least another of the at least two commonalities. FIG. 6 provides an example where a trend involves two commonalities: months within a particular year (i.e., a time-based commonality) and a particular person (i.e., an object-based commonality). Consequently, the trend involves a subset of digital image records from the collection 10 that were (a) deemed to have been captured during the particular one-year period of time and (b) deemed to have captured an image of the particular person. For purposes of this example, assume that this trend is used at step 14 to identify a user subject interest for the particular person.

The chart 600 represents how the digital image records in this subset are separated into the individual months (i.e., instances) within the particular year. The Y-axis 602 of the chart 600 represents the number of digital image records in the collection 10 that were deemed to have captured an image of the particular person. The X-axis 604 of the chart represents individual months (i.e., instances) within the particular year. The threshold 606 indicates the minimum number of digital image records (eight in this example) needed for a month (i.e., an instance) to be considered in the level-of-interest calculation. In this case, months May, July, November, and December have a sufficient number of digital image records (i.e., eight in this example) associated therewith to be considered in the level-of-interest calculation. In this regard, it is deemed that four months (i.e., instances) out of the twelve different months have at least a meaningful number of images (eight in this example) of the particular person. This information may be used to identify a higher level-of-interest in the particular person (i.e., the user subject interest) than may be identified if, for example, only one month was deemed to have a meaningful number of images of the particular person.

Figure 7:
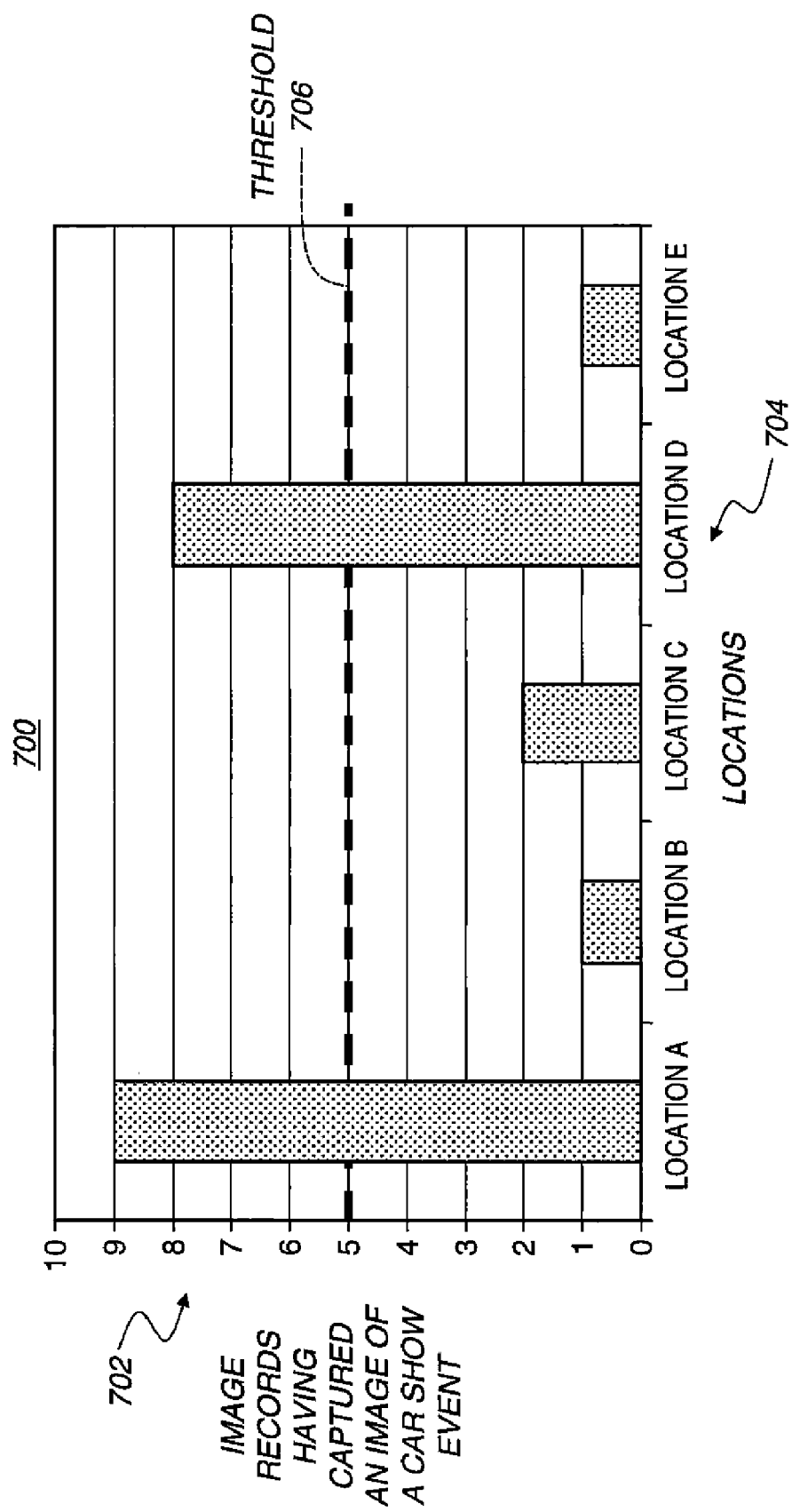

FIG. 7 provides an example where a trend involves two commonalities: locations within a particular spatial region (i.e., a location-based commonality) and a car show event (i.e., an event-based commonality). It should be noted that the particular spatial region could be defined as narrowly or broadly as desired. For example, the particular spatial region could be defined as broadly as the planet Earth or even the Universe, or could be defined more narrowly as a country, state, town, etc. In the example of FIG. 7, the trend involves a subset of digital image records from the collection 10 that were (a) deemed to have been captured at a location within the particular spatial region and (b) deemed to have captured an image of a car show event. For purposes of this example, assume that this trend is used at step 14 to identify a user subject interest in car shows.

The chart 700 represents how the digital image records in this subset are separated into the locations (i.e., instances) within a particular spatial region. The Y-axis 702 of the chart 700 represents the number of digital image records in the collection 10 that were deemed to have captured an image of a car show event. The X-axis 704 of the chart represents individual locations (i.e., instances) within the particular spatial region. The threshold 706 indicates the minimum number of digital image records (five in this example) needed for a location (i.e., an instance) to be considered in the level-of-interest calculation. In this case, Locations A and D have a number of digital image records associated therewith that meet the threshold 706. In this regard, it is deemed that two locations (i.e., instances) out of the five different locations have at least a meaningful number of images (five in this example) of a car show event. This information may be used to identify a lower level-of-interest in car shows (i.e., the user subject interest) than may be identified if, for example, ten different locations were deemed to have a meaningful number of images of a car show even. In other words, users that acquire images of car shows at several different locations may be more likely to have a higher level-of-interest in car shows than users that have images of car shows at only one or a few different locations.

Figure 8:
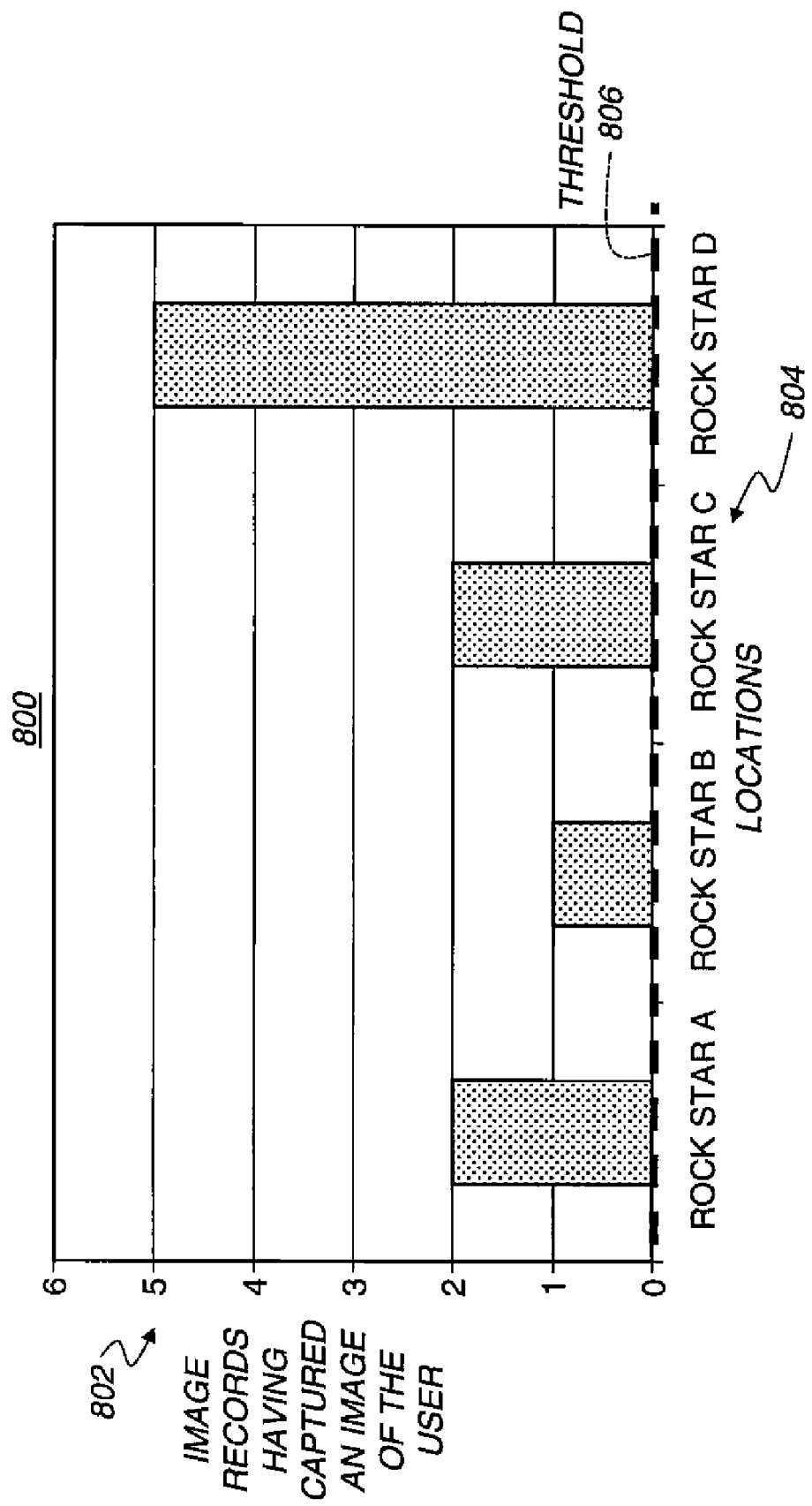

FIG. 8 provides an example where a trend involves two object-based commonalities: (a) rock stars and (b) the user. In this regard, the trend involves a subset of digital image records from the collection 10 that were (a) deemed to have captured an image of a rock star and (b) deemed to have captured an image of the user. For purposes of this example, assume that this trend is used at step 14 to identify a user subject interest in rock music.

The chart 800 represents how the digital image records in this subset are separated by the individual rock stars (i.e., instances) they have been deemed to have imaged. The Y-axis 802 of the chart 800 represents the number of digital image records in the collection 10 that were deemed to have imaged the user. The X-axis 804 of the chart 800 represents the individual rock starts (i.e., instances) that have been imaged. The threshold 806 indicates the minimum number of digital image records (zero in this example) needed for a rock star (i.e., an instance) to be considered in the level-of-interest calculation. In this case, because the threshold 806 is zero, all imaged rock stars are considered in the level-of-interest calculation, because it may be that having even a single image with the user and a rock star is meaningful. Accordingly, the determination that the user has been imaged with four different rock stars may be used to identify a higher level-of-interest in rock music (i.e., the user subject interest) than may be identified if, for example, the user had never been imaged with a rock star.

Accordingly, it can be seen from the above-examples, that the invention is not limited to any particular type of analysis of the trends identified in step 12 to determine levels-of-interest for user subject interests.

After generating user subject interests and, optionally, levels of interest, at step 14, step 15 optionally may be performed by some embodiments of the present invention to generate user preferences. The phrase "user preference," as used herein, is intended to refer to a linking of multiple user subject interests together based at least upon an analysis of the trend (s) identified at step 12. For example, assume that a first trend is identified in step 12 in a first set of multiple digital image records capturing a skiing activity, and a second trend is identified in a second set of multiple digital image records capturing a particular person. Also assume that the second set of digital image records is a subset of the first digital image records, so the digital image records that captured the particular person are also digital image records that captured the skiing activity. In this case, the first trend may result in identification of 'skiing' as a first user subject interest, and the second trend may result in identification of the 'particular person' as a second user subject interest. Also in this case, the step of identifying preferences may be configured to recognize the overlap of these two user subject interests because they occur in at least some of the same digital image records. This recognized overlap may result in the generation of a user preference indicating that the user prefers to go skiing with the particular person. That is, this user preference links the 'skiing' user subject interest with the 'particular person' user subject interest. Accordingly, it can be seen that user preference determinations may occur as an additional layer of processing after user subject interests have been generated.

One may observe that in the immediately preceding example, a user subject interest of 'skiing with the particular person' may have been generated at step 14 based at least upon analysis of the two trends in one embodiment of the present invention. In such an embodiment, it would not be necessary to generate a user preference linking a 'skiing' user subject interest with a 'particular person' user subject interest, because a user subject interest combining these two interests was already generated at step 14. However, in some embodiments of the present invention, generating specific user subject interests, such as 'skiing with the particular person' may not be preferred. In these embodiments, it may be useful, instead of generating specific user subject interests, to generate user preferences that link simple user subject interests. Accordingly, it can be seen that the invention is not limited to the manner in which user subject interests and user preferences are generated, and the manner in which they are generated is subject to design choice.

After or during generation of the user subject interests and, optionally, the levels of interest or user preferences, profile generation in step 16 in FIG. 2 may be carried out. In this step, a data structure of some type can be formed, as user profile 20, and its data fields populated according to the user subject interests and the preferences.

The phrase "user profile," as used herein, refers to a collection of information that indicates the interests of an associated user, regardless of the information-collection's form or the manner in which it is stored. The user profile 20 may be generated from any data that characterizes the user, not just the user subject interests or user preferences identified at step 14. In this regard, the user profile 20 may be supplemented or refined by any other source of information about the user, whether conventional or not. In addition, the user profile 20 may, in fact, have been originally produced by one or more sources of information other than from methods of the present invention, and then supplemented or refined by a method of the present invention.

For example, a user profile could be maintained based on internet sites visited by the user over the preceding months, using methods such as those described in U.S. Pat. No. 6,539,375 entitled "Method and System for Generating and Using a Computer User's Personal Interest Profile" to Kawasaki. Information from user digital image records that has been generated using a method according to an embodiment of the present invention can be used to supplement or refine the profile data that has been obtained using the Kawasaki '375 method. Or, in the alternative, information from user digital image records that has been generated according to the Kawasaki '375 method may be used to supplement or refine a user profile that has been obtained using a method according to an embodiment of the present invention.

In addition, it should be noted that the user profile 20 may be stored indefinitely in non-volatile memory or may be generated dynamically as needed. Accordingly, one of ordinary skill in the art will appreciate that the invention is not limited to any particular user-profile format or any particular contents of a user profile.

Figure 3:
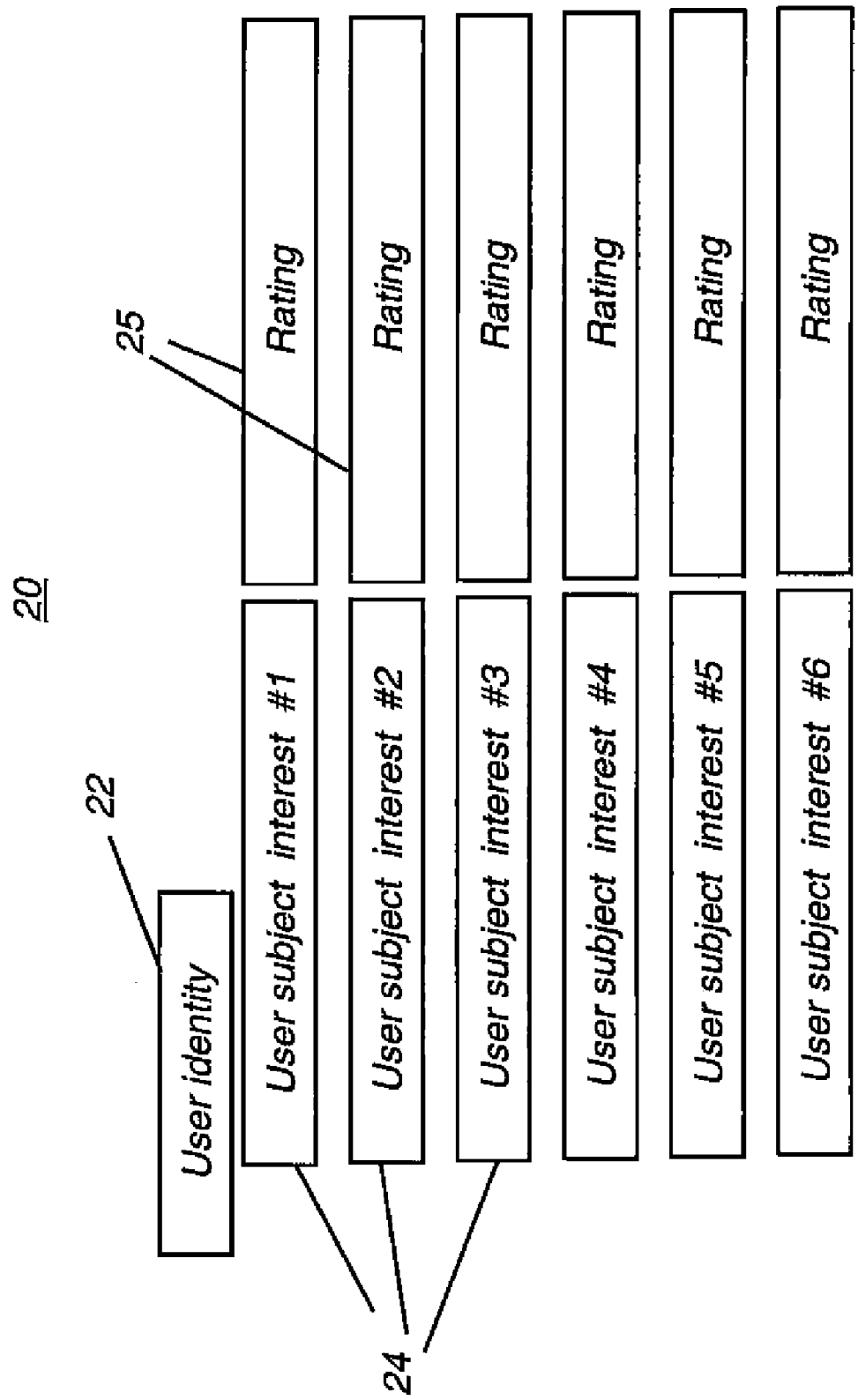
FIG. 3 is a schematic diagram showing a user profile formed as a data structure in one embodiment of the present invention.

With that said, however, it still is instructive to consider some example user profiles that illustrate some of the features and types of data that may be of interest in some embodiments of the present invention. FIG. 3 shows an example user profile that includes a user identification field 22 that may store a user name, identification number, or other identifier for a particular person having a digital image record collection account. It can be appreciated that the name of the user may not be known to the organization or entity that uses user profile 20. Accordingly, keeping a name out of the user identity field 22 would enable some level of individual privacy protection, so that user profile 20 could be accessible to an advertiser or other interested entity without compromising the privacy of the account user.

Fields 24 are associated with user identification field 22 and store data on one or more user subject interests. In the example of FIG. 3, an optional rating field 25 may store a level-of-interest rating corresponding to the associated user subject interest, as previously discussed.

In one embodiment, user profile 20 of FIG. 3 has fixed data fields, in which user subject interests are predefined. For example, user profile 20 could be designed to obtain information about a specific set of interests. Thus, user subject interest #1 could relate to the user's apparent interest in sports or sporting events; user subject interest #2 could relate to level of family involvement or interest; user subject interest #3 could relate to apparent travel interests of the user; and so on. In this regard, step 14 in FIG. 2 may search for these predefined user subject interests from the trends identified in step 12 and may assign an appropriate level-of-interest rating for those user subject interests found.

Continuing with the example, the level-of-interest rating for subject interest #1 may indicate the likely level-of-interest for sporting goods, game tickets, or other items. The rating for subject interest #3 may indicate the likely level-of-interest of this user for airfare special offers or cruise packages. In one embodiment, the model of FIG. 3 is used for every user account, based on interests that an advertiser might be looking for. It should be noted, however, that the user subject interests shown in FIG. 3 need not be fixed between users and, instead, may be generated specifically for a particular user based at least upon the trends identified from the particular user's digital image record collection in step 12.

Figure 4:
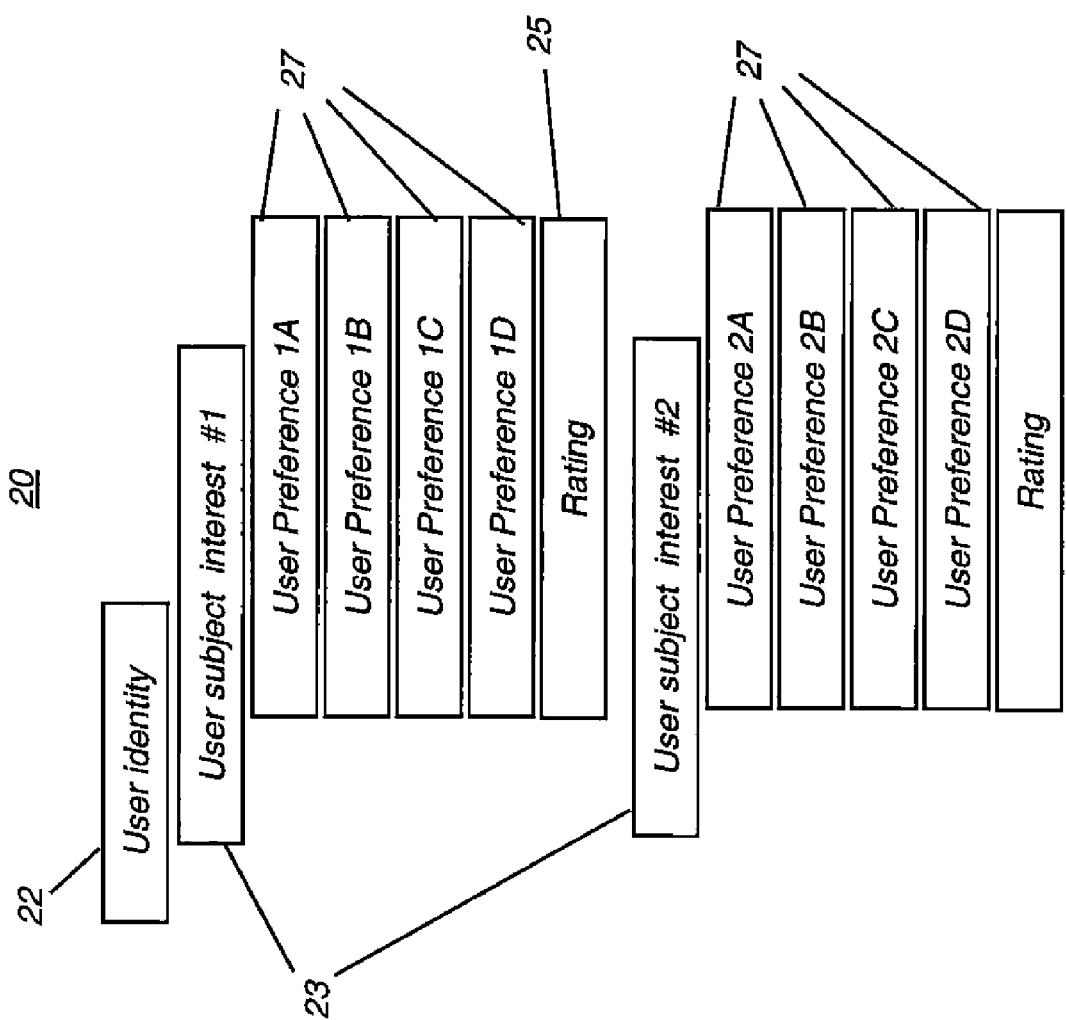
FIG. 4 is a schematic diagram showing another user profile formed as a data structure, according to an embodiment of the present invention.

Another example user profile 20 is shown in the embodiment of FIG. 4. Here, user preference information is associated with the user subject interests 24. In particular, each user preference data field 27 may indicate a link to another user subject interest. For example, a user preference 1A associated with user subject interest #1 may indicate a link to user subject interest #2. In this regard, the user preference 1A may indicate that when the user enjoys interacting with user subject interest #1, the user also enjoys interacting with user subject interest #2.

It is to be understood that the exemplary embodiments are merely illustrative of the present invention and that many variations of the above-described embodiments can be devised by one skilled in the art without departing from the scope of the invention. It is therefore intended that all such variations be included within the scope of the following claims and their equivalents.

PARTS LIST

10 Digital image record collection
11a, 11b, 11c, 11d Digital image records
12 Trend identification step
14 Subject interest identification step
15 Optional user preferences step
16 User profile generation step
20 User profile
22 Identification field
23 User Subject Interest Field
24 Processor-accessible memory system
25 Rating Field
26 Data Processing System
27 User Preference Field
28 User Interface System
30 Peripheral System
90 Time Stamp
91-94 Trends
600 Chart
602 Y-axis
604 X-axis
606 Threshold
700 Chart
702 Y-axis
704 X-axis
706 Threshold
800 Chart
802 Y-axis
804 X-axis
806 Threshold

What is claimed is:

1. A method implemented at least in part by a data processing system, the method for generating a user profile for a particular user, and the method comprising the steps of:
automatically identifying one or more trends based at least upon an analysis of image content from a plurality of digital image records associated with the particular user, wherein each trend represents commonality between multiple digital image records and the commonality relates at least to one of the following: events, or location,
identifying a plurality of the particular user's subject interests based at least upon an analysis of the trends;
generating a user profile associated with the particular user based at least upon the particular user's subject interests; and
storing the particular user profile in a processor-accessible memory system.

2. The method of claim 1, wherein each of the trends involve a commonality detected based at least upon an analysis of the image content from at least some of the plurality of digital image records.

3. The method of claim 2, wherein the step of identifying one or more trends only identifies trends that meet a commonality threshold.

4. The method of claim 3, wherein the commonality threshold indicates that a commonality must be detected (a) among at least X of the plurality of digital image records, wherein X is an integer, or (b) among a particular percentage of the plurality of digital image records.

5. The method of claim 1, wherein at least one of the trends involves a combination of multiple commonalities.

6. The method of claim 1, wherein at least one of the trends relates to multiple digital image records that are deemed to have captured a reoccurring event.

7. The method of claim 1, wherein the analysis of image content includes a scene classification process, an object detection process, an audio analysis process, a text-from-image extraction process, or an event clustering process.

8. The method of claim 1, further comprising the step of identifying the particular user's preferences based at least upon an analysis of the trends, wherein the user preferences link at least two of the user subject interests together, and wherein the particular user profile is further generated or updated based at least upon the user preferences.

9. The method of claim 8, wherein one of the particular user subject interests is a particular activity and another of the user subject interests is a particular person, and wherein one of the user preferences links the particular activity with the particular person.

10. The method of claim 1, further comprising the step of identifying a level-of-interest for at least some of the particular user subject interests based at least upon an analysis of the trends, wherein the particular user's profile is further generated or updated based at least upon the levels of interest.

11. The method of claim 10, wherein the analysis of the trends for purposes of identifying the level-of-interest involves consideration of a number of digital image records involved in at least one of the trends with respect to a number of digital image records in the plurality of digital image records.

12. The method of claim 10, wherein the analysis of the trends for purposes of identifying the level-of-interest involves consideration of a recency of digital image records involved in at least one of the trends.

13. The method of claim 10, wherein the analysis of the trends for purposes of identifying the level-of-interest involves an analysis of a particular trend comprising two commonalities, and wherein the analysis of the particular trend involves a consideration of a number of different instances of a first of the two commonalities, wherein each of the different instances has associated therewith a set of digital image records deemed to represent at least the corresponding instance and a second of the two commonalities.

14. The method of claim 13, wherein each of the two commonalities relates to one or more events, one or more objects, one or more locations, or time.

15. The method of claim 1, further comprising the steps of:
generating an invitation for the user to interact with a particular user subject interest based at least upon an analysis of the particular user's profile; and
storing the invitation in a processor-accessible memory system.

16. The method of claim 1, wherein at least one of the particular user's subject interests is identified based at least upon an analysis of at least two of the trends.

* * * * *